United States Patent [19]

Taniguchi et al.

[11] Patent Number: 5,215,868
[45] Date of Patent: Jun. 1, 1993

[54] METHOD FOR RECORDING INFORMATION VIA PHOTO-RECORDING MEDIUM

[75] Inventors: Hitoshi Taniguchi; Fumio Matsui, both of Saitama, Japan

[73] Assignee: Pioneer Electronic Corporation, Tokyo, Japan

[21] Appl. No.: 631,314

[22] Filed: Dec. 21, 1990

[30] Foreign Application Priority Data

Jul. 6, 1990 [JP] Japan ................ 2-179798

[51] Int. Cl.⁵ .............................. G11B 7/24
[52] U.S. Cl. ..................... 430/332; 430/19; 430/495; 430/945; 430/962
[58] Field of Search ........... 430/332, 19, 962, 339, 430/495, 270, 945; 346/135.1; 252/586, 589

[56] References Cited

U.S. PATENT DOCUMENTS 4,794,068 12/1988 Miyazaki et al. .............. 430/345
4,837,063 6/1989 Irie .................................. 428/64
4,845,240 7/1989 Hibino et al. .................. 549/252

Primary Examiner—Charles L. Bowers, Jr.
Assistant Examiner—John A. McPherson
Attorney, Agent, or Firm—Sughrue, Mion, Zinn, Macpeak & Seas

[57] ABSTRACT

When information recording is conducted by converting a non-colored state of a recording film into a colored state, use is made of a recording light having a wavelength in such a range that an absorbance of the non-colored state is higher than an absorbance of the colored state. When information erasing is conducted by converting a non-colored state of a recording film into a colored state, use is made of an erasing light having a wavelength in such a range that an absorbance of the non-colored state of the recording film is higher than an absorbance of the colored state. Accordingly, the present invention has the advantage of a great change of color being exhibited in the recording film, thus enabling optimal recording and erasing of information.

1 Claim, 3 Drawing Sheets

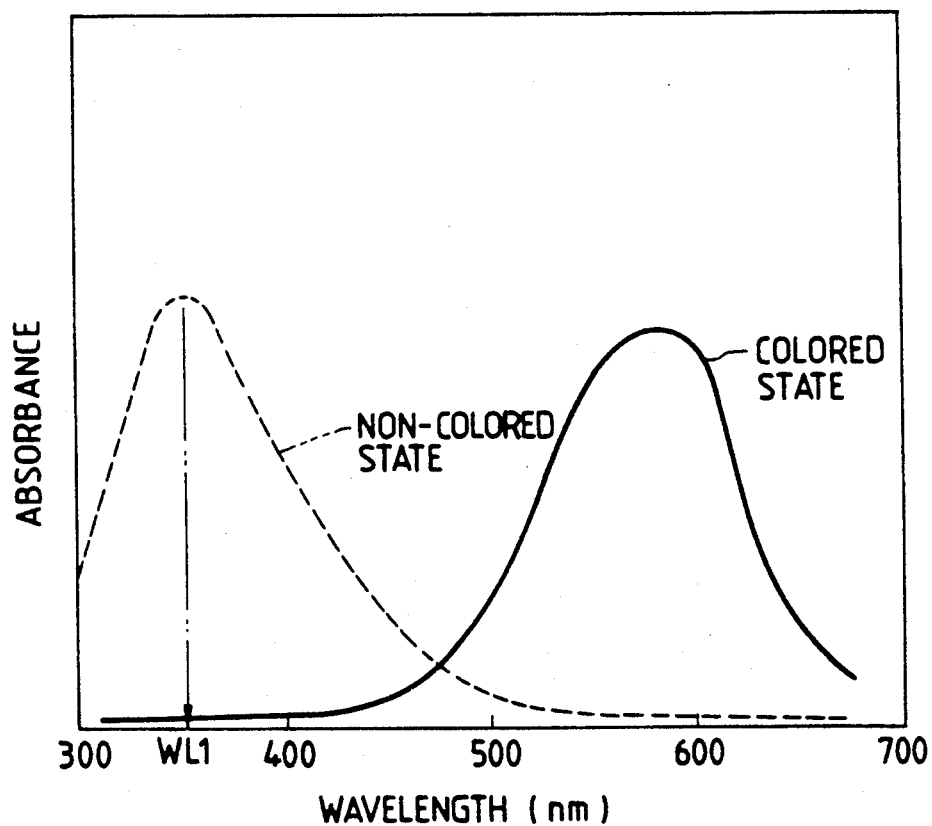

METHOD FOR RECORDING INFORMATION VIA PHOTO-RECORDING MEDIUM

BACKGROUND OF THE INVENTION

1. Field of the Invention

This invention relates to a method for recording or erasing information via a photo-recording medium (or an optical recording medium) having a recording film comprising a photochromic material as a main component.

2. Background Art

Photochromic materials have heretofore been used for filters for adjusting quantity of light, displays, actinometers, recording media for photographic printing, paints and so forth.

Furthermore, photochromic materials have recently attracted attention to the use as materials for photo-recording media in the field of photo-recording utilizing laser beams because of their possible utility for reversible memory media for high-density information recording.

Among methods for recording information via a photo-recording medium using a photochromic material for a recording film of the medium, there is known for example a method which comprises irradiating ultraviolet light beams of a specific wavelength onto the recording film in its non-colored state so as to convert the film into its colored state. In this method, it is known that when the recording film used has such a property that the peak of absorbance of the colored state appears in a visible region (i.e. not in an ultraviolet region) and the absorbance distribution of the colored state does not overlap with the absorbance distributions of the non-colored state in the vicinity of the peak of absorbance of the non-colored state which appears in an ultraviolet region, as shown in FIG. 5, it is best to use a wavelength of WL1 indicated in FIG. 5, i.e. a wavelength corresponding to the peak of the absorbance distribution of the non-colored state of the recording film, for the recording light to be irradiated onto the recording film.

On the other hand, there are known photochromic materials having such a property that, when used as materials for the recording film of a photo-recording medium, the absorbance distribution of the non-colored state of the film overlaps with the absorbance distribution of the colored state in the vicinity of the respective peaks of the both distributions, as shown in FIG. 1. When such photochromic materials are used for the recording film of a photo-recording medium, it is not always best to use a wavelength corresponding to the peak of absorbance distribution of the non-colored state of the recording film, for the recording light to be irradiated, since by the irradiation of the recording light having that wavelength a reaction toward the non-colored state may also proceed to some extent concurrently with a reaction toward the colored state in the recording film.

This also holds similarly in the adverse case where an erasing light is irradiated onto a recording film to convert it from its colored state into its non-colored state, thereby effecting erasure of information.

Accordingly, it is a primary object of this invention to provide a method for recording or erasing information via a photo-recording medium having a recording film comprising the above mentioned photochromic materials as a main component having such a property that the absorbance distributions of the colored and non-colored states thereof overlap in the vicinity of the respective peaks of the both distributions, wherein a light for recording and a light for erasing information are respectively used each having a best-selected wavelength.

SUMMARY OF THE INVENTION

To achieve the foregoing object and in accordance with the purpose of the present invention, as embodied and broadly described herein, the present invention provides a method for recording information via a photo-recording medium having a recording film comprising a photochromic material which comprises irradiating a recording light onto the recording film to convert the film from its non-colored state into its colored state, said recording film having such a property that an absorbance distribution of its non-colored state overlaps with an absorbance distribution of its colored state in the vicinity of the respective peaks of both the distributions and said recording light having a wavelength in such a range that the absorbance of the non-colored state of the recording film is higher than the absorbance of the colored state.

In accordance with the present invention, there is also provided a method for erasing information recorded on a photo-recording medium having a recording film recorded by changing previously colored state into non-colored state comprising a photochromic material which comprises irradiating an erasing light onto the recording film to convert the film from its non-colored state into its colored state, said recording film having such a property that an absorbance distribution of its non-colored state overlaps with an absorbance distribution of its colored state in the vicinity of the respective peaks of both the distributions and said erasing light having a wavelength in such a range that the absorbance of the non-colored state of the recording film is higher than the absorbance of the colored state.

According to the present invention, when information recording is conducted by converting the non-colored state of the recording film into the colored state, use is made of a recording light having a wavelength in such a range that an absorbance of the non-colored state is higher than an absorbance of the colored state. When information erasing is conducted by converting the non-colored state of the recording film into the colored state, use is made of an erasing light having a wavelength in such a range that the absorbance of the non-colored state of the recording film is higher than the absorbance of the colored state. Accordingly, the present invention has the advantage of a great change of color being exhibited in the recording film, thus enabling the best recording (write) and erasing of information.

BRIEF DESCRIPTION OF THE DRAWINGS

FIG. 5 is a graph indicating the relationship between wavelength and absorbance with respect to the colored state (P1) of the recording medium, i.e. P2/P1, because a maximum since in this case the degree of coloring because a maximum.

Figure 1:
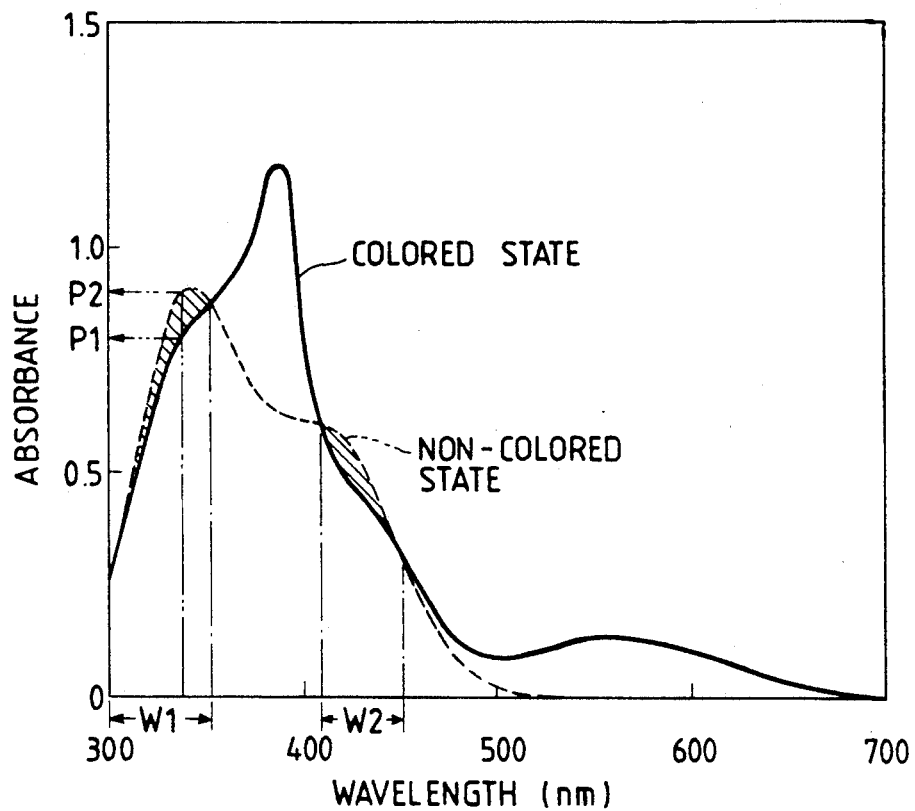
FIG. 1 is a graph indicating the relationship between wavelength and absorbance with respect to the colored state and the non-colored state of a recording film to be used according to the present invention.

The absorbance distributions of the non-colored state and the colored state shown in FIG. 1 are those of the ring-opened state and the ring-closed state of a diarylethene derivative represented by the following structural formula:

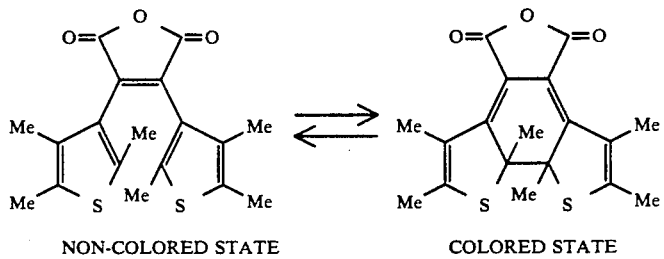

NON-COLORED STATE      COLORED STATE state and the non-colored state of a recording film having such a property that the absorbance distributions of the colored and non-colored states do not overlap in the vicinity of the respective peaks of the both distributions.

DETAILED DESCRIPTION OF THE INVENTION

Reference will be made in detail to the present invention, taking the case of recording information as an example.

Figure 4:
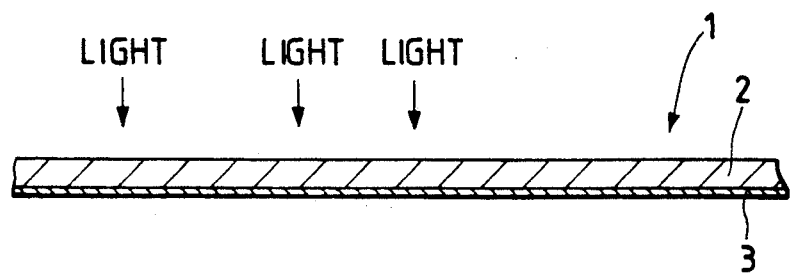
FIG. 4 is a schematic sectional view of a photo-recording medium to be used in the present invention.

FIG. 4 is a fragmentary sectional view of one embodiment of a photo-recording medium usable in the present invention.

In FIG. 4, the photo-recording medium 1 has a recording film 3 on a substrate 2. Usually, a recording light is irradiated from the side of the transparent substrate 2 so as to effect information recording in the recording film.

The photo-recording medium may further comprise a various known layer between the substrate 2 and the recording film 3 or comprise it on the recording film 3.

The recording film 3 comprises a photochromic material as a main component. Therefore, by the irradiation onto the recording film of a light having a specific wavelength, there occurs a color change in the film, i.e. from a non-colored state to a colored state. The recording film has such a property that, as shown in FIG. 1, an absorbance distribution of the non-colored state (indicated by the dotted line in FIG. 1) overlaps with an absorbance distribution of the colored state (indicated by the solid line in FIG. 1) in the vicinity of the respective peaks of the both distributions.

Photochromic materials having such a property may include organic compounds such as spiropyran, flugide, dihydropyrene, thioindigo, piperidine, azirine and polycyclic aromatic compounds, etc.

As a recording light to be irradiated onto the recording film comprising one of these materials, according to the present invention, use may be made of a light having a wavelength in such a range that the absorbance of the non-colored state of the film is higher than the absorbance of the colored state. Thus, when referring to FIG. 1, the recording light usable in the present invention has a wavelength either within the area W1 (300–350 nm) or within the area W2 (410–450 nm). Especially, such light is most preferably used that has a wavelength at which the ratio between the absorbance of the non-colored state (P2) and the absorbance of the colored state (P1) of the recording medium, i.e. P2/P1, because a maximum since in this case the degree of coloring because a maximum.

As shown by the above formula, this compound is in its ring-opened state (non-colored state) under ordinary conditions, and is changed into its ring-closed state (colored state) by the irradiation of a recording light (ultraviolet light). The colored state returns back to the non-colored state reversibly by the irradiation of a visible light.

In contrast to this compound, there are some compounds which are usually in their ring-closed states, and ring-opened by the irradiation of an ultraviolet light to take coloring. Examples of these compounds may include spiropyran compounds.

The recording film usually further comprises a binder such as vinyl chloride resin, acrylic resin, polyvinyl alcohol, styren resin, phenol resin, vinyl acetate resin, polyurethane and polyester, etc.

Reference will now be made in detail to the advantage obtained by the present invention, with referring to FIG. 2 and FIG. 3.

Figure 2:
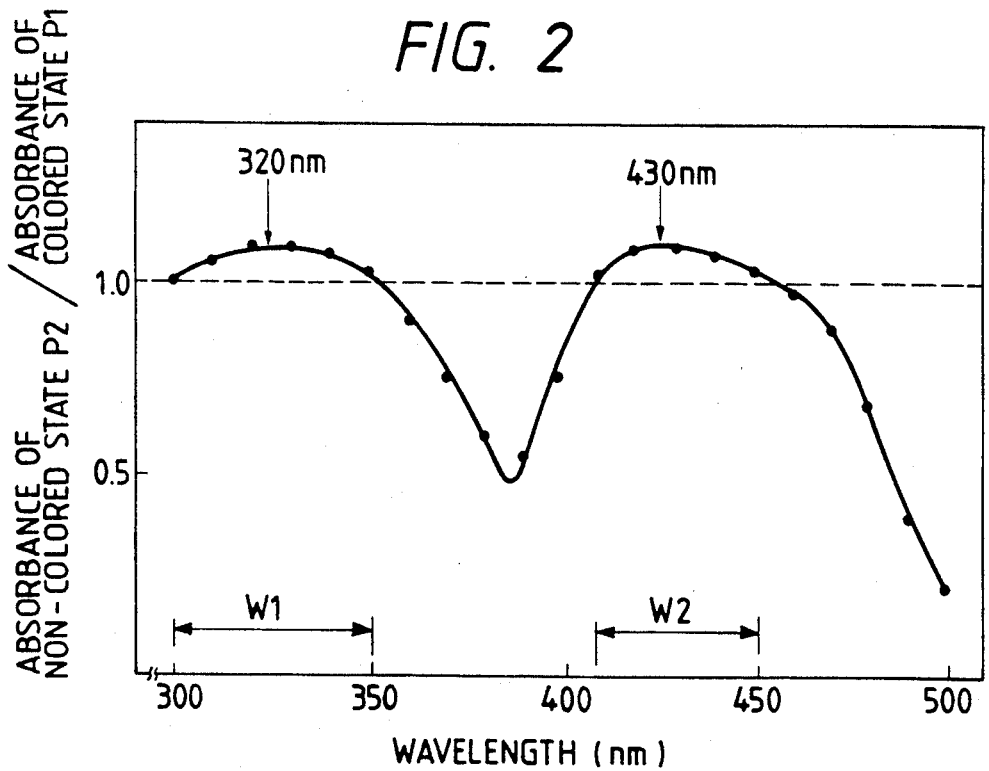
FIG. 2 is a graph indicating the relationship between wavelength and the ratio P2/P1 (P1 denotes the absorbance of the colored state and P2 denotes the absorbance of the non-colored state, P1 and P2 both being in accordance with the distributions shown in FIG. 1)

FIG. 2 is a graph showning the relationship between the ratio P2/P1 and wavelength, where P1 denotes the absorbance of the colored state and P2 denotes the absorbance of the non-colored state, P1 and P2 both being in accordance with the absorbance distributions shown in FIG. 1. In FIG. 2, the two wavelength regions W1 (300–350 nm) and W2 (410–450 nm) where the value P2/P1 exceeds 1 can be regarded as effective wavelength resions for recording according to the present invention. Especially, the wavelength corresponding to the two peak values of P2/P1 in the W1 and W2 region, i.e. 320 nm and 430 nm, are regarded as the optimal wavelengths for the recording light to be irradiated according to the present invention.

In order to confirm the above mentioned advantage according to the present invention, an experiment was carried out as explained below.

First, recording lights of various wavelengths were respectively irradiated onto the recording film in the non-colored state having the same absorbance distributions as shown in FIG. 1, to obtain the corresponding various colored states. For the various colored states thus obtained, measurements were carries out to determine the respective absorbances thereof at λ=560 nm. The results are shown in FIG. 3, where the abscissa represents the wavelengths of recording lights irradiated onto the non-colored state of the recording film (and the wavelengths corresponding to the dots indicate the wavelengths of the recording lights irradiated onto the non-colored state of films in the experiment).

Figure 3:
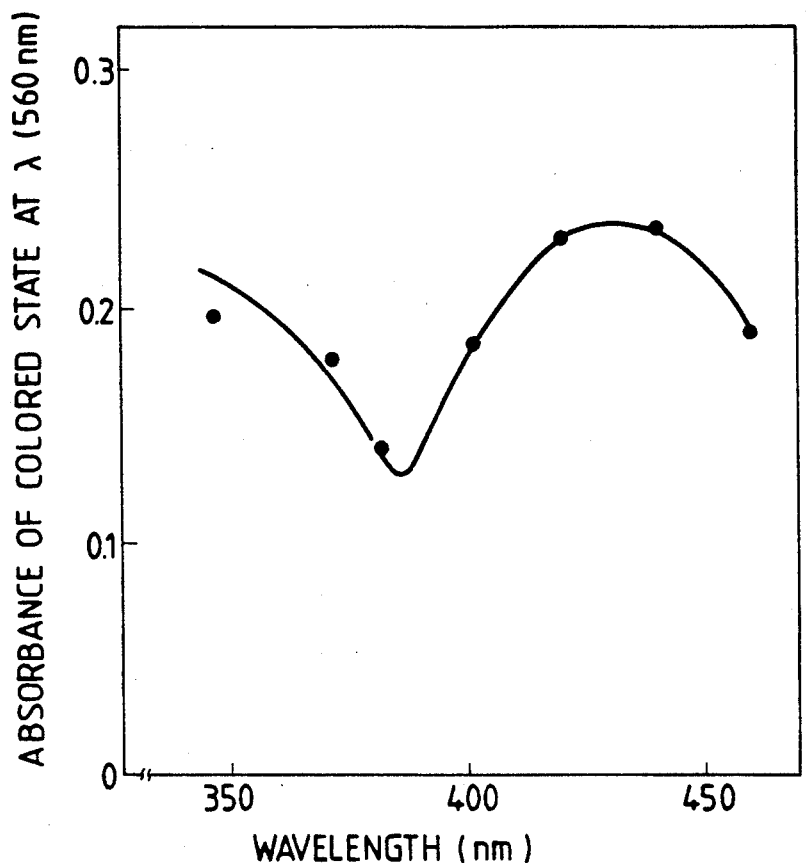
FIG. 3 is a graph indicating the relationship between wavelength and the absorbance of the colored state (at λmax=560 nm)

With respect to the graph shown in FIG. 3, a higher absorbance value indicates a greater degree of coloring as compared to a lower absorbance value.

As will be noted, the graph of FIG. 3, which represents the results of actual measurements, takes a shape very similar to that of the theoretical graph of FIG. 2. This clearly demonstrates the advantage of the present invention.

It should be noted here that the above mentioned specific values for the effective wavelength ranges for recording are only applicable to the recording film made of the compound having the above described structural formula. When different types of photochromic materials are used for a recording film, the effective wavelength ranges for recording should differ, accordingly.

In the foregoing, the present invention is explained in detail with regard to the case of recording information where the non-colored state of the recording film is converted into the colored state by the irradiation of a recording light. Converting the non-colored state of the recording film to the colored state is adaptable for not only the recording method but also an erasing method. That is, the same explanation will also hold in the case of erasing information by converting the non-colored state of the recording film to the colored state by irradiating an erasing light to a recording film which is previously recorded by changing the colored state into the non-colored state. In this case, use is made of an erasing light having a wavelength in such a range that the absorbance of the non-colored state is higher than the absorbance of the colored state.

What is claimed is:

1. A method for recording information via a photorecording medium having a recording film comprising a photochromic material, said method being characterized by a step for irradiating a recording light onto a recording film to convert the film from its non-colored state into its colored state, said recording film having such a property that an absorbance distribution of said non-colored state overlaps with an absorbance distribution of said colored state in the vicinity of the respective peaks of both said distributions and said recording light having a wavelength in such a range that the absorbance of said non-colored state of the recording film is higher than the absorbance of said colored state, wherein the recording light has a wavelength at which the absorbance ratio between the non-colored state and the colored state of the recording film is a maximum.

* * * * *